United States Patent

Kaneko et al.

[11] Patent Number: 5,864,739
[45] Date of Patent: Jan. 26, 1999

[54] LIGHT SOURCE PACKAGE INCORPORATING THERMAL EXPANSION COMPENSATING DEVICE AND IMAGE FORMING APPARATUS USING THE SAME

[75] Inventors: Fumio Kaneko; Kouichi Takemura; Takao Sugano; Hiroyuki Matsuo; Yukihiro Matsushita, all of Kawasaki, Japan

[73] Assignee: Fujitsu Limited, Kawasaki, Japan

[21] Appl. No.: 864,921

[22] Filed: May 29, 1997

[30] Foreign Application Priority Data

Jan. 10, 1997 [JP] Japan .................................. 9-003107

[51] Int. Cl.⁶ .......................... G02B 27/00; G03G 15/04
[52] U.S. Cl. ............................................. 399/220; 359/820
[58] Field of Search ........................ 347/241, 242, 347/244, 256–258; 359/820; 372/34; 399/220, 4

[56] References Cited

U.S. PATENT DOCUMENTS 4,850,674  7/1989  Hasselskog .............................. 359/820
4,918,702  4/1990  Kimura ..................................... 372/34
5,504,516  4/1996  Bax ..................................... 347/241 X
5,622,189  4/1997  Murano ................................. 399/220

FOREIGN PATENT DOCUMENTS 3-179420  8/1991  Japan .
3-179421  8/1991  Japan .
6-43386   6/1994  Japan .

Primary Examiner—Arthur T. Grimley
Assistant Examiner—Quana Grainger
Attorney, Agent, or Firm—Armstrong, Westerman, Hattori, McLeland & Naughton

[57] ABSTRACT

A light source package includes a light source, a lens for collimating the light from the light source, and a support member for supporting the light source and the lens so that the optical axis of the lens is set to a desired position relative to the light source. The support member includes a compensating device for compensating the lens for deviation of the optical axis of the lens resulting from a difference in the coefficients of linear thermal expansion between the lens and the support member when the ambient temperature changes.

9 Claims, 5 Drawing Sheets

LIGHT SOURCE PACKAGE INCORPORATING THERMAL EXPANSION COMPENSATING DEVICE AND IMAGE FORMING APPARATUS USING THE SAME

BACKGROUND OF THE INVENTION

1. Field of the Invention

The present invention relates to a light source package used in such optical systems as a photocopier, a laser printer, or similar image forming apparatus, and to an image forming apparatus using the light source package.

2. Description of the Related Art

Conventional image forming apparatus have a light source and a lens supported by a lens support member in the housing and compensate the lens for changes in focal length and refractive index resulting from the thermal expansion and contraction of the lens by utilizing the thermal expansion and contraction of the housing. Examples of such packages are disclosed in Japanese laid-open Patent Publication (Kokai) Nos. Hei 3(1991)-179420 and Hei 3(1991)-179421.

However, while such conventional apparatus compensate the lens for changes in the focal length and refractive index of the lens when an ambient temperature changes, the ambient temperature change also causes the optical axis of the lens to deviate from the normal optical axis position if the lens and the lens support member are made from materials with different thermal expansion coefficients. Such a deviation in optical axis prevents images from being properly formed.

This is particularly a problem in a multi-beam image forming apparatus in which optical beams from plural laser sources are converted into optical beams for image formation by using corresponding lenses so that the plural laser beams simultaneously scan the object in parallel. When the optical axis of each lens becomes offset from the axis of the light source, the scanned positions on the object tend to move close to or apart from each other, and normal image formation is thus prevented.

SUMMARY OF THE INVENTION

The object of the present invention is therefore to provide, with consideration for these problems, a light source package wherein the optical axis of the lens to the light source is not caused to deviate when the ambient temperature changes, and to provide an image forming apparatus using the light source package.

To achieve the above object, a light source package according to the present invention comprises a light source, a lens for collimating the light from the light source, and a support member for supporting the light source and the lens so that the optical axis of the lens is set to a predetermined position relative to the light source, wherein the support member comprises a compensation device for compensating the lens for deviation of the optical axis of the lens resulting from a difference in the coefficients of linear thermal expansion between the lens and the support member when the ambient temperature changes.

A further object of the invention is to provide an image forming apparatus comprising a plurality of optical devices for emitting light beams modulated by image signals, a photoconductor, a scanning device for reflecting the light beams emitted from the optical devices to scan the photoconductor, a developer for developing the latent electrostatic image formed by the light beams on the photoconductor, a transfer unit for transferring the developed image to an output medium, and a fixing unit for fixing the transferred image, wherein each of the optical devices is the light source package of the invention.

BRIEF DESCRIPTION OF THE DRAWINGS

The present invention will become more fully understood from the detailed description given below and the accompanying drawings wherein.

DESCRIPTION OF THE PREFERRED EMBODIMENTS

A laser diode can be used as the light source of the present invention. Examples of such laser diodes include the LT025MF0 laser diode manufactured by Sharp Corporation, the SDL-6030-01 from Sanyo Electric Co., Ltd., ML6412C from Mitsubishi Electric Corporation, HL7852G from Hitachi, Ltd., and LN9735PS from Matsushita Electronics Corporation.

A plastic or glass lens can be used for the lens for collimating the light from the light source. Examples of glass lenses include the known BK7 and M-Lac130 lenses.

The support member supports the light source and the lens so that the optical axis of the lens is positioned in a particular manner corresponding to the light source. The support member is typically made of brass or other metal.

A compensation device mechanically absorbs the dimensional difference between the lens and the support member resulting from a change in temperature to compensate the lens for any deviation of the optical axis relative to the light source. To accomplish this, the compensation device comprises a lens holder, a lens barrel, and a pressing member.

Figure 3:
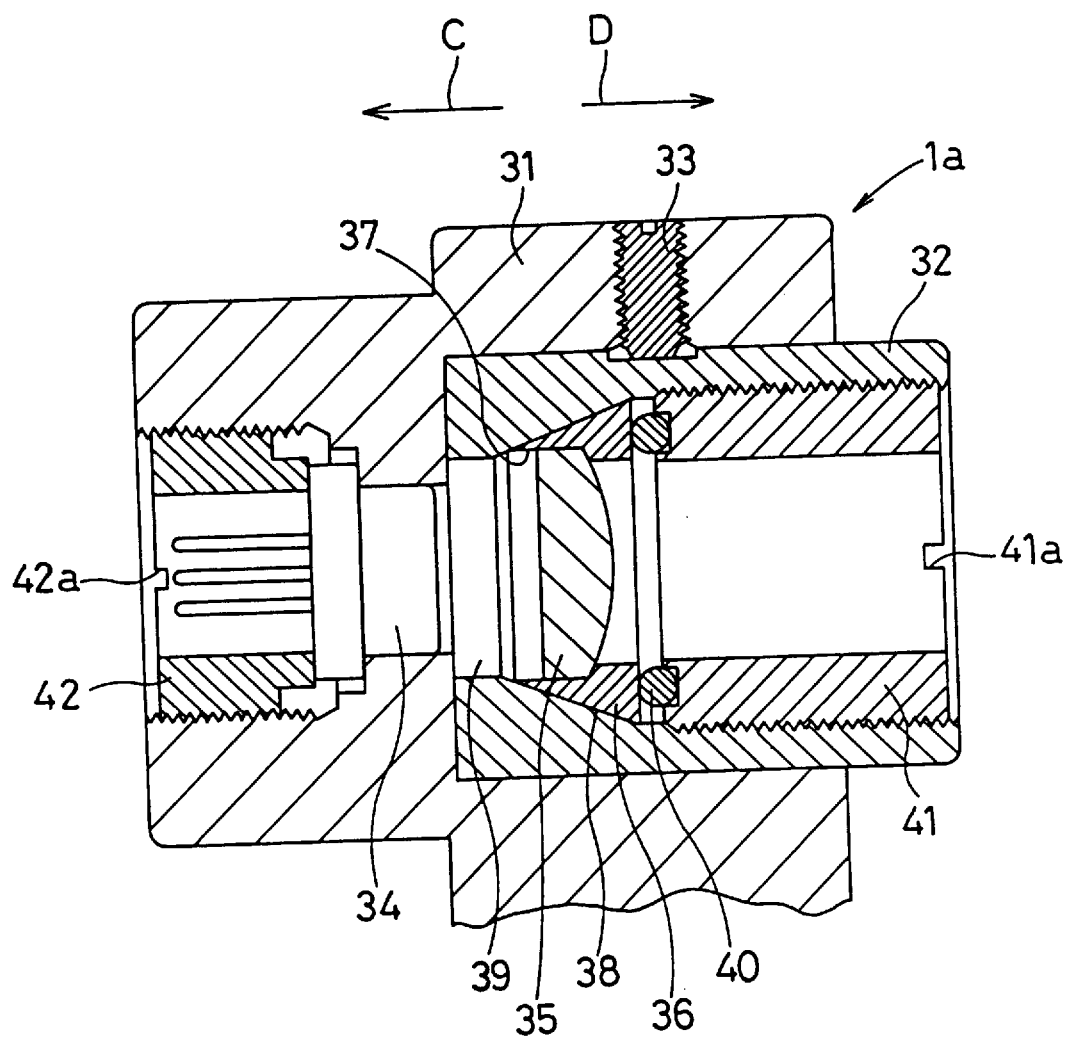
FIG. 3 is a cross section of an essential part shown in FIG. 1.

The lens holder has a truncated cone or pyramid shape (a cone or pyramid frustum shape) with a through-hole formed coaxially therein. The lens holder holds the lens in this through-hole and has substantially the same coefficient of linear thermal expansion as the lens. The lens barrel has a through-hole whose inside surface has a truncated cone or pyramid shape for holding the lens holder so that the lens holder is guided by the through-hole for being fitted onto the inside surface, as shown in FIG. 3. The pressing member is disposed in the lens barrel for elastically pressing the lens holder and the lens barrel on each other so that the lens holder closely contacts the conical or pyramidal inside surface of the lens barrel.

Materials that can be used for a lens holder having substantially the same coefficient of linear thermal expansion as the lens include alumina ceramics (with a linear expansion coefficient of 6.7 to 8.0×10⁻⁶ cm/cm/°C) and zirconia ceramics (with a linear expansion coefficient of 4.4 to 4.6×10⁻⁶ cm/cm/°C.).

Preferably, the lens barrel is made of metal because of such considerations as processability and durability. For example, the lens barrel may be formed of brass by cutting.

Materials that can be used for the pressing member for elastically pressing the lens holder and the lens barrel on each other include rubber O-rings, coil springs, and wave spring washers.

Figure 1:
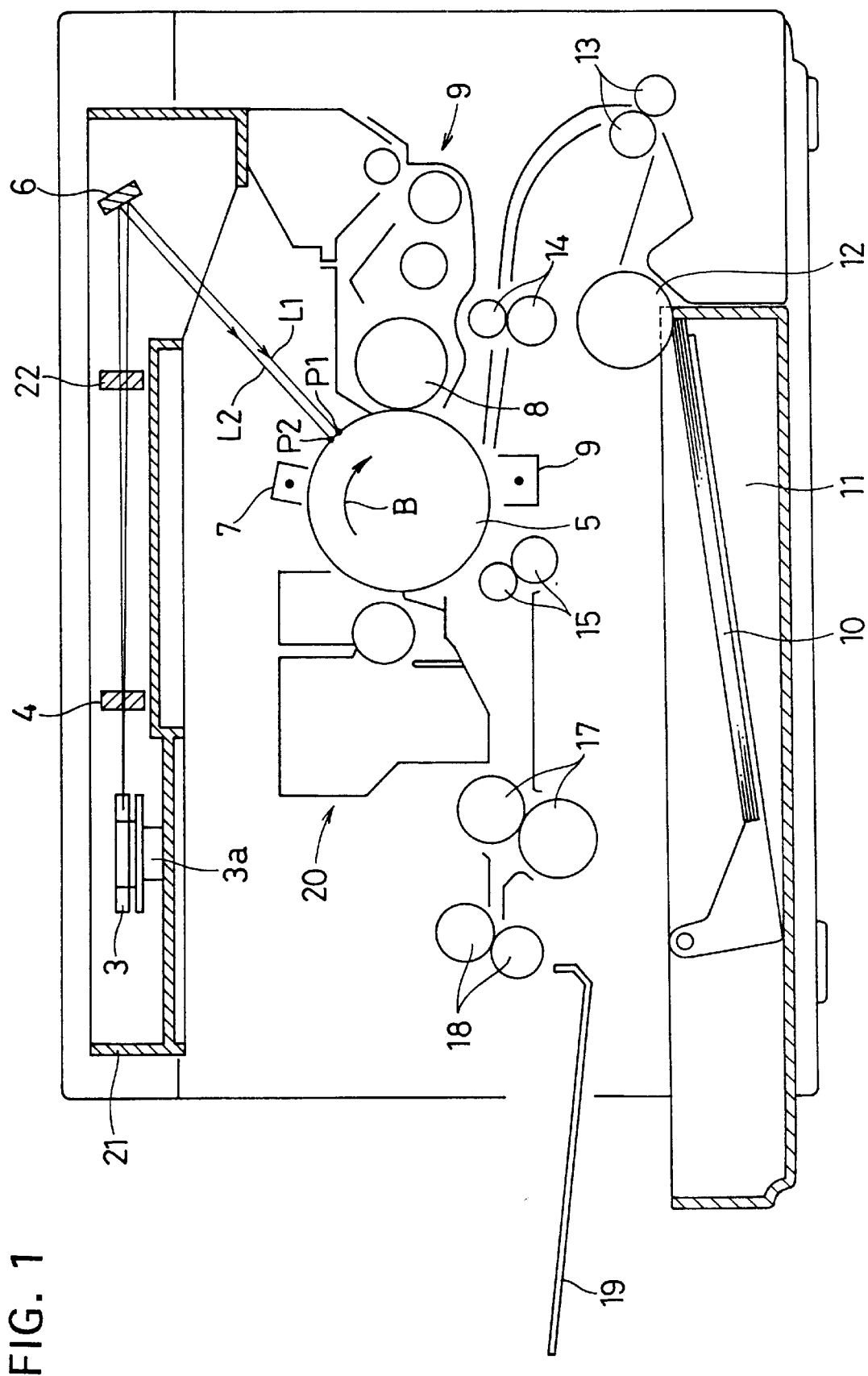
FIG. 1 is an explanatory view for showing a construction of a laser printer according to a preferred embodiment of the invention.
Figure 2:
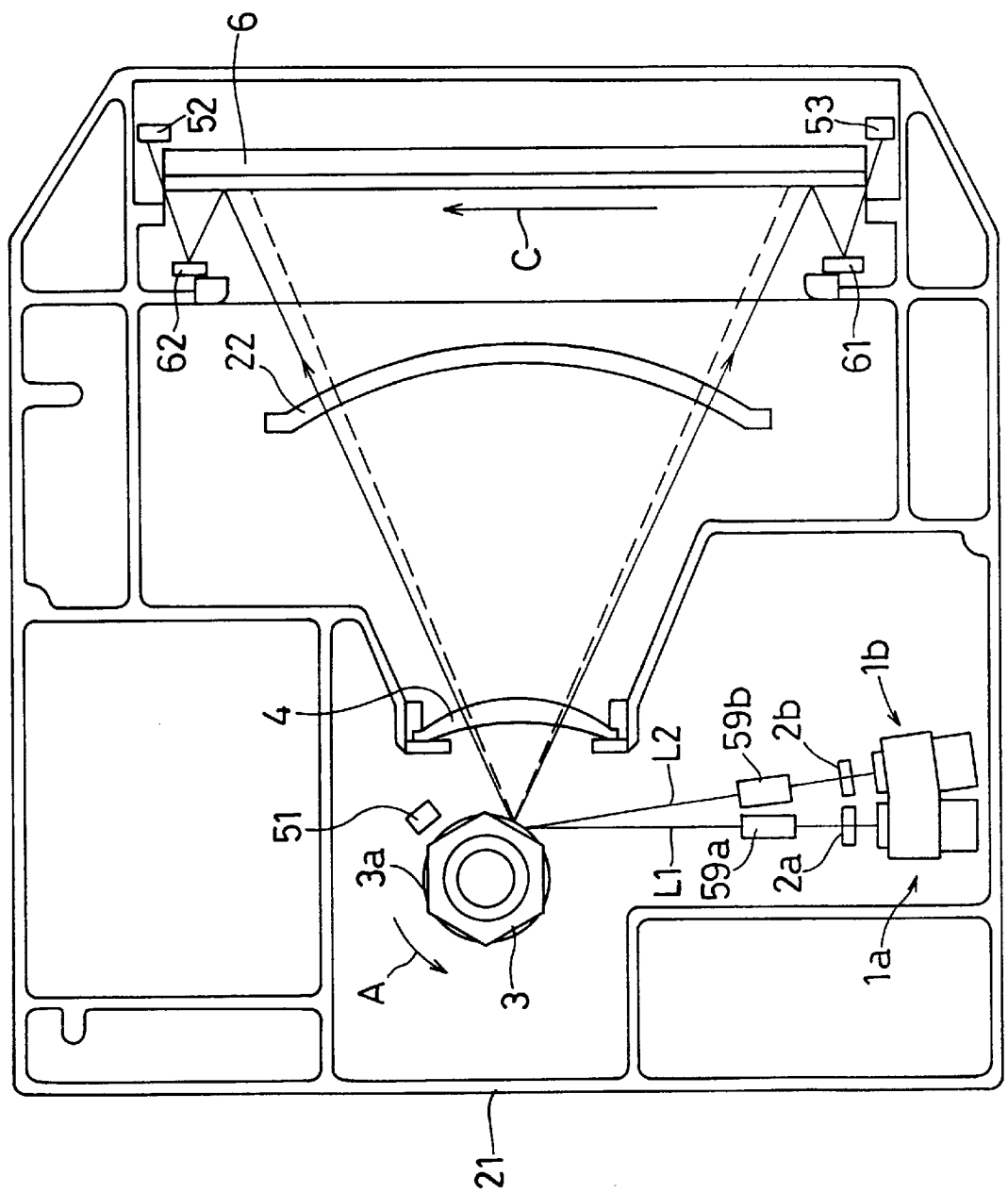
FIG. 2 is a top view of the optical system shown in FIG. 1.

FIG. 1 is a cross-sectional side view showing a multibeam laser printer according to a preferred embodiment of the invention, and FIG. 2 is a top view of the optical system shown in FIG. 1.

As shown in these figures, the laser printer comprises, inside an optical system housing 21, a pair of light source packages 1a and 1b, cylindrical lenses 2a and 2b, a polygonal mirror 3, a motor 3a for rotating the polygonal mirror 3 in the direction of arrow A at a predetermined speed, an f·θ lens 4, a photoconductive drum 5, and a plane mirror 6.

The pair of light source packages 1a and 1b emit beams L1 and L2, which correspond to the image signals inputted to each light source. The cylindrical lenses 2a and 2b adjust the cross-sectional shape of the two beams L1 and L2 emitted from the light sources 1a and 1b, and the polygonal mirror 3 then reflects the beams L1 and L2 from the cylindrical lenses 2a and 2b off the six mirror surfaces of the polygonal mirror 3 for scanning. The f·θ lens 4 compensates for distortion aberration of the beams reflected by the polygonal mirror 3, and the plane mirror 6 then reflects and focuses on the photoconductive drum 5 the beams passed through the f·θ lens 4.

The laser printer includes a corona discharger 7 for uniformly charging the surface of the photoconductive drum 5 in advance; a developing unit 19 for supplying a developer by means of developer roller 8 onto the surface of the photoconductive drum 5; a cassette 11 for storing recording sheets 10; a feeding roller 12 for feeding the recording sheet from the cassette 11; a pair of transport rollers 13 for transporting the recording sheet; a pair of resistance rollers 14 for intermittently transporting the recording sheet toward the photoconductive drum 5 at a predetermined timing; an image transfer corona discharger 9 for charging the recording sheet transported by the resistance rollers 14 to transfer the image developed on the photoconductive drum 5 onto the surface of the recording sheet; a pair of separation rollers 15 for separating the image-transferred recording sheet from the photoconductive drum 5; a pair of fixing rollers 17 for heating the recording sheet to fix the image; a pair of ejection rollers 18 for ejecting the recording sheet from the laser printer after fixing; a tray 23 for receiving the ejected recording sheet; and a cleaning unit 20 for cleaning the surface of the photoconductive drum 5 after the image is transferred to the sheet.

It should be noted that the f·θ lens 4 focuses the light beam, incident at an angle θ to the optical axis of the lens, onto the screen disposed away by the focal length f from the lens and at a position away by f·θ from the optical axis.

The overall operation of a laser printer thus constructed is now described below.

When beams L1 and L2 corresponding to the image signals are emitted from the light source packages 1a and 1b (FIG. 2), the beams L1 and L2 are reflected by the rotating polygonal mirror 3 and focused at points P1 and P2 on the surface of the photoconductive drum 5 via the f·θ lens 4 and the plane mirror 6. Rotation of the polygonal mirror 3 thus allows the beams L1 and L2 to scan the surface of the photoconductive drum 5.

The surface of the photoconductive drum 5 uniformly charged in advance by the charging corona discharger 7 and rotating in the direction of arrow B is scanned by the beams L1 and L2 to form a latent electrostatic image. Application of a developer by the developer roller 8 then makes the latent electrostatic image appear.

The recording sheet 10 stored in the cassette 11 is transported by the supply roller 12 and then by transport rollers 13, and stops temporarily when the leading edge of the sheet reaches the resistance rollers 14. Operation of the resistance rollers 14 is timed to the progress of image development by the photoconductive drum 5 to transport the recording sheet 10 under and in contact with the developing area of the photoconductive drum 5.

The image transfer corona discharger 9 then discharges on the back side of the recording sheet 10 to transfer the developer which forms a positive image on the surface of the photoconductive drum 5 to the recording sheet 10. Once the image is transferred, the recording sheet 10 is separated from the photoconductive drum 5 by the separation rollers 15 and transported to the fixing rollers 17.

The recording sheet 10 on which the developer is fixed by heating by the fixing rollers 17 is ejected by the ejection rollers 18 to the tray 23 to complete the print cycle for one recording sheet. After image transfer is completed, the surface of the photoconductive drum 5 is cleaned by the cleaning unit 20 to prepare for the next print cycle.

FIG. 3 is a detailed cross section of the light source package 1a shown in FIG. 2. Note that the other light source package 1b is constructed in a manner similar to the light source package 1a, and further description thereof is thus omitted below.

Referring to FIG. 3, an inner lens barrel 32 is housed in an outer lens barrel 31 with the position fixed by a screw 33. A laser diode 34 is housed in the outer lens barrel 31 coaxially with the inner lens barrel 32 and is secured by a tubular screw 42.

Figure 4:
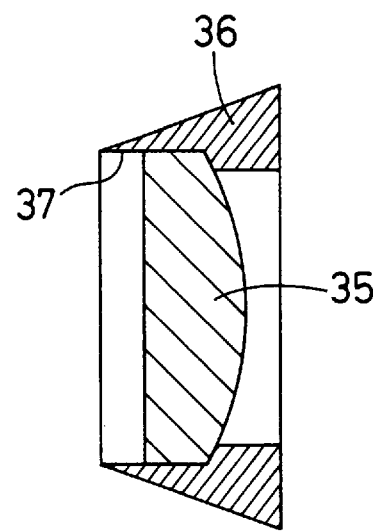
FIG. 4 is an enlarged cross section of a portion of the essential part shown in FIG. 3.

A collimator lens 35 for collimating a light from the laser diode 34 is housed in a lens holder 36. As shown in FIG. 4, the lens holder 36 has a truncated cone shape or cone frustum shape with a through-hole 37 formed coaxially therein. The collimator lens 35 is housed inside the through-hole 37 and is fixed to the lens holder 36 by a quick-setting adhesive.

The inner lens barrel 32 has a through-hole 39 whose inside surface has a truncated cone or cone frustum shape that is fitted onto the outside surface of the lens holder 36. The lens holder 36 is housed in the through-hole 39 of the inner lens barrel 32 with the vertex end of the lens holder 36 seated in the vertex end of the through-hole 39 as shown in FIG. 3. The lens holder 36 is fixed in close contact with the conical inside surface 38 of the through-hole 39 by means of elastic pressure applied thereto by a tubular screw 41 via a rubber O-ring 40. The rubber O-ring 40 is compressed by 10% to 20% at this time, and thus the lens holder 36 is urged in the direction of the laser diode 34 (the direction of arrow C) by elastic force of the rubber O-ring 40.

The materials used for the component elements described above and the coefficients of linear thermal expansion (cm/cm/°C.) of those materials are shown in the table below.

| | | |
|---|---|---|
| collimator lens 35 | M-Lac130 | $6.9 \times 10^{-6}$ |
| lens holder 36 | alumina ceramic | $6.7$ to $8.0 \times 10^{-6}$ |
| outer lens barrel 31 | brass | $18$ to $23 \times 10^{-6}$ |
| inner lens barrel 32 | brass | $18$ to $23 \times 10^{-6}$ |
| threaded parts 33, 41, 42 | brass | $18$ to $23 \times 10^{-6}$ |
| diode package 34 | brass | $18$ to $23 \times 10^{-6}$ |

Figure 6:
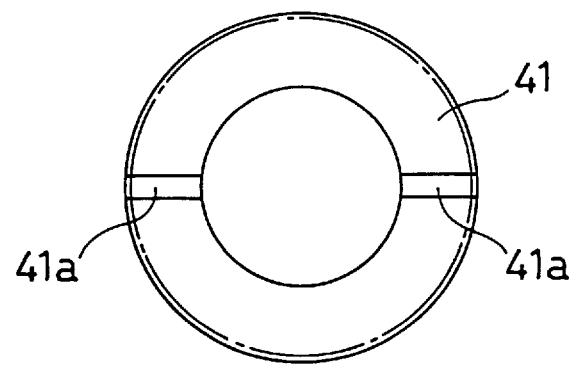
FIG. 6 is a side view of a portion of the essential part shown in FIG. 3.
Figure 7:
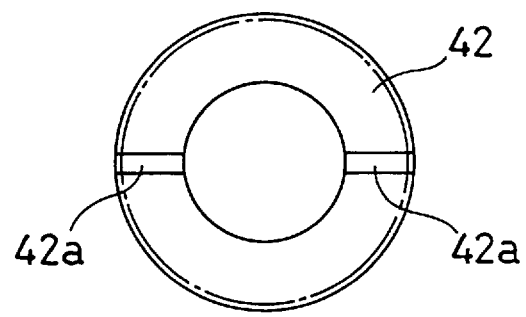
FIG. 7 is a side view of another portion of the essential part shown in FIG. 3.

FIG. 6 and FIG. 7 are side views of the tubular screws 41 and 42 which include grooves 41a and 42a in the end thereof, respectively. The grooves 41a, 42a are used to tighten the tubular screws 41 and 42 using, for example, a screwdriver.

In this configuration, when the ambient temperature rises, the outer lens barrel 31, the inner lens barrel 32, the screws 33, 41 and 42, and the laser diode package 34 all expand by the same amount in dimension because they all have substantially the same thermal expansion coefficient. The collimator lens 35 and the lens holder 36 similarly have substantially the same thermal expansion coefficient, and therefore also expand substantially by the same amount.

The thermal expansion coefficient of the inner lens barrel 32, however, is greater than that of the lens holder 36. As a result, the inside diameter of the conical inside surface 38 of the inner lens barrel 32 increases by an amount greater than the outside diameter of the lens holder 36 held therein, and a gap or clearance thus develops therebetween. The pressure of the rubber O-ring 40 urging in the direction of arrow C, however, causes the lens holder 36 to move in the direction of arrow C, and thus the lens holder 36 remains in contact with the conical inside surface 38 of the inner lens barrel 32. The optical axis of the collimator lens 35 therefore remains correctly aligned with the light source 34 and does not deviate from the preset position.

Conversely, when the ambient temperature drops, thermal contraction causes the conical inside surface 38 of the inner lens barrel 32 to compress the lens holder 36. This compressive force causes the lens holder 36 to move in the direction of arrow D, thereby compressing the rubber O-ring 40. The rubber O-ring 40 then absorbs the movement of the lens holder 36 caused by contraction of the conical inside surface 38 of the inner lens barrel 32. The optical axis of the collimator lens 35 thus remains correctly aligned and does not deviate from the preset position. The lens holder 36 and the collimator lens 35 are also not mechanically distorted or damaged.

Figure 5:
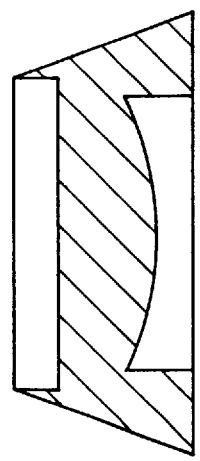
FIG. 5 is a cross section of an alternative embodiment of the portion of the essential part of the invention shown in FIG. 3.

It should be noted that the lens holder 36 can be manufactured integrally with the collimator lens 35 and from the same material as the collimator lens 35, as shown in FIG. 5. A coil spring or a wave spring washer can also be used in place of the rubber O-ring 40.

It is therefore possible by means of the light source package of the present invention to compensate, with good precision, for potential shift (deviation) of the optical axis of the lens relative to the light source caused by changes in the ambient temperature. Therefore, by using a plurality of such light source packages in a multi-beam image forming apparatus, it is possible to consistently assure normal image formation without being affected by temperature changes.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A light source package comprising:
    a lens holder engaging, and thereby serving to hold, the lens and having substantially the same coefficient of linear thermal expansion as the lens,
    a lens barrel holding the lens holder,
    a pressing member elastically pressing the lens holder and the lens barrel against each other in an optical axis direction of the lens,
    said pressing member being operative to absorb a clearance between the lens holder and the lens barrel resulting from a difference in coefficients of linear thermal expansion therebetween by thermally induced relative expansive movement of the lens holder with respect to the lens barrel in the optical axis direction of the lens, and
    cooperating tapered surfaces on said lens barrel and said lens holder being in mutual engagement and being operative to induce said lens barrel to move said lens holder against said pressing member upon the occurrence of thermally induced compressive movement between said lens barrel and said lens bolder.

2. The light source package comprising
    a light source,
    a lens for collimating a light from the light source, and
    a support member for supporting the light source and the lens so that an optical axis of the lens is set to a predetermined position relative to the light source,
    wherein the support member comprises a compensation device for compensating the lens for deviation of the optical axis of the lens resulting from a difference in coefficients of linear thermal expansion between the lens and the support member when an ambient temperature changes and wherein the compensation device comprises
    a lens holder having a truncated cone shape with a through-hole formed coaxially to hold the lens therein, the lens holder having substantially the same coefficient of linear thermal expansion as the lens,
    a lens barrel having a through-hole whose inside surface has a truncated cone shape for holding the lens holder so that the lens holder is guided by the through-hole for being fitted onto the inside surface, and
    a pressing member disposed in the lens barrel for elastically pressing the lens holder and the lens barrel against each other so that the lens holder is fitted onto the conical inside surface of the lens barrel.

3. The light source package according to claim 1 or 2 wherein the lens barrel is made from a metal and the lens holder is made from a ceramic.

4. An image forming apparatus comprising
    a plurality of optical devices for emitting light beams modulated by image signals,
    a photoconductor,
    a scanning device for reflecting the light beams emitted from the optical devices to scan the photoconductor,
    a developer for developing a latent electrostatic image formed on the photoconductor by the light beams,
    a transfer unit for transferring the developed image onto an output medium, and
    a fixing unit for fixing the transferred image,
    wherein each of the optical devices comprises the light source package of claim 3.

5. The light source package according to claim 1 or 2 wherein the lens holder and the lens are integrally made from the same material.

6. An image forming apparatus comprising a plurality of optical devices for emitting light beams modulated by image signals, a photoconductor, a scanning device for reflecting the light beams emitted from the optical devices to scan the photoconductor, a developer for developing a latent electrostatic image formed on the photoconductor by the light beams, a transfer unit for transferring the developed image onto an output medium, and a fixing unit for fixing the transferred image, wherein each of the optical devices comprises the light source package of claim 5.

7. The light source package according to any one of claims 1 to 2 wherein the light source comprises a laser diode.

8. An image forming apparatus comprising a plurality of optical devices for emitting light beams modulated by image signals, a photoconductor, a scanning device for reflecting the light beams emitted from the optical devices to scan the photoconductor, a developer for developing a latent electrostatic image formed on the photoconductor by the light beams, a transfer unit for transferring the developed image onto an output medium, and a fixing unit for fixing the transferred image, wherein each of the optical devices comprises the light source package of claim 7.

9. An image forming apparatus comprising a plurality of optical devices for emitting light beams modulated by image signals, a photoconductor, a scanning device for reflecting the light beams emitted from the optical devices to scan the photoconductor, a developer for developing a latent electrostatic image formed on the photoconductor by the light beams, a transfer unit for transferring the developed image onto an output medium, and a fixing unit for fixing the transferred image, wherein each of the optical devices comprises the light source package of any one of claims 1 and 2.

* * * * *